US012270350B2

(12) United States Patent
(10) Patent No.: US 12,270,350 B2
(45) Date of Patent: Apr. 8, 2025

Matsuura et al.

(54) ENGINE CONTROL APPARATUS

(71) Applicant: Honda Motor Co., Ltd., Tokyo (JP)

(72) Inventors: Katsuya Matsuura, Wako (JP); Kohtaro Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/587,431

(22) Filed: Feb. 26, 2024

(65) Prior Publication Data

US 2024/0328368 A1 Oct. 3, 2024

(30) Foreign Application Priority Data

Mar. 28, 2023 (JP) ................................ 2023-051061

(51) Int. Cl.
*F02D 19/06* (2006.01)
*F02D 41/00* (2006.01)
(Continued)

(52) U.S. Cl.
CPC ....... *F02D 19/061* (2013.01); *F02D 19/0634* (2013.01); *F02D 19/0649* (2013.01);
(Continued)

(58) Field of Classification Search
CPC .... F02D 41/40; F02D 41/1497; F02D 41/009; F02D 19/061; F02D 19/0649;
(Continued)

(56) References Cited

U.S. PATENT DOCUMENTS 8,245,671 B2 * 8/2012 Leone ................. F02D 41/3094 123/3
8,869,754 B2 * 10/2014 Shimada ................ F02M 27/02 60/671

(Continued)

FOREIGN PATENT DOCUMENTS

JP 2006233839 A 9/2006
JP 2010236466 A 10/2010

(Continued)

OTHER PUBLICATIONS

Japanese office action; Application 2023-051061; Jan. 21, 2025.

*Primary Examiner* — Phutthiwat Wongwian
*Assistant Examiner* — Diem T Tran
(74) *Attorney, Agent, or Firm* — Duft & Bornsen, PC

(57) ABSTRACT

Engine control apparatus includes: an engine including an injector and ignition plug, and a controller configured to control the injector and ignition plug to switch combustion mode to a second homogenous charge compression ignition combustion of reformed fuel with ignition at required torque less than a first predetermined value, to a first homogenous charge compression ignition combustion of reformed fuel, obtained by reforming a portion of gasoline fuel into peroxide, without ignition at required torque more than the first predetermined value and less than a second predetermined value, to spark ignition combustion of gasoline with ignition at required torque more than the second predetermined value and less than a third predetermined value, and to diffusion (Continued)

combustion of reformed fuel without ignition at required torque more than the third predetermined value.

8 Claims, 10 Drawing Sheets

(51) Int. Cl.
*F02D 41/14* (2006.01)
*F02D 41/40* (2006.01)
*F02M 27/02* (2006.01)
*F02P 5/15* (2006.01)
*F02D 41/38* (2006.01)

(52) U.S. Cl.
CPC ....... *F02D 19/0689* (2013.01); *F02D 41/009* (2013.01); *F02D 41/1497* (2013.01); *F02D 41/40* (2013.01); *F02M 27/02* (2013.01); *F02P 5/1502* (2013.01); *F02D 2041/389* (2013.01); *F02D 2200/0611* (2013.01)

(58) Field of Classification Search
CPC ................. F02D 19/0689; F02D 27/02; F02D 2041/389; F02D 19/0634; F02D 19/0671; F02D 2200/0611; F02D 35/023; F02D 35/027; F02D 37/02; F02D 41/0025; F02D 41/3035; F02D 41/3041; F02D 41/3064; F02D 41/3076; F02P 5/1502; F02P 5/152; F02M 27/02
See application file for complete search history.

(56) References Cited

U.S. PATENT DOCUMENTS

| | | | | |
|---|---|---|---|---|
| 2004/0144337 | A1* | 7/2004 | Wakao | F02M 25/12 123/3 |
| 2008/0275621 | A1 | 11/2008 | Kobayashi | |
| 2022/0235729 | A1* | 7/2022 | Hashimoto | F02M 37/0047 |

FOREIGN PATENT DOCUMENTS

| | | |
|---|---|---|
| JP | 2022112890 A | 8/2022 |
| JP | 2022112891 A | 8/2022 |

* cited by examiner

ENGINE CONTROL APPARATUS

CROSS-REFERENCE TO RELATED APPLICATION

This application is based upon and claims the benefit of priority from Japanese Patent Application No. 2023-051061 filed on Mar. 28, 2023, the content of which is incorporated herein by reference.

BACKGROUND OF THE INVENTION

Field of the Invention

The present invention relates to an engine control apparatus.

Description of the Related Art

Conventionally, a device for reforming gasoline fuel supplied to an engine is known. For example, in a device described in JP 2022-112891 A, after octane gasoline fuel for a spark ignition type engine is reformed into low-octane gasoline having high ignitability by an oxidation reaction in an in-vehicle reformer as necessary, the gasoline fuel is injected into a combustion chamber and subjected to compression ignition (diffusion combustion) in the combustion chamber.

In the device described in JP 2022-112891 A, only the diffusion combustion using the reformed fuel having high ignitability is assumed. However, since there is also an operating region in which thermal efficiency of the engine is higher when the gasoline fuel before reforming is used as it is, the thermal efficiency of the engine may decrease in the device described in JP 2022-112891 A.

SUMMARY OF THE INVENTION

An aspect of the present invention is an engine control apparatus, including: an engine including an injector configured to inject fuel into a combustion chamber and an ignition plug configured to ignite air-fuel mixture of the fuel and air in the combustion chamber; and a controller configured to control the injector and the ignition plug to switch a combustion mode based on a required torque of the engine. The combustion mode includes: a spark ignition combustion of gasoline fuel with ignition; a first homogenous charge compression ignition combustion of reformed fuel without ignition, the reformed fuel being obtained by reforming a portion of the gasoline fuel into peroxide; a second homogenous charge compression ignition combustion of the reformed fuel with ignition; and a diffusion combustion of the reformed fuel without ignition. The controller controls the injector and the ignition plug: to switch the combustion mode to the second homogenous charge compression ignition combustion when the required torque is less than a first predetermined value; to switch the combustion mode to the first homogenous charge compression ignition combustion when the required torque is equal to or more than the first predetermined value and less than a second predetermined value larger than the first predetermined value; to switch the combustion mode to the spark ignition combustion when the required torque is equal to or more than the second predetermined value and less than a third predetermined value larger than the second predetermined value; and to switch the combustion mode to the diffusion combustion when the required torque is equal to or more than the third predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 14. An engine control apparatus according to the embodiment of the present invention is applied to an engine mounted on a vehicle and having an injector that injects fuel into a combustion chamber and an ignition plug that ignites a mixer in the combustion chamber, and performs engine control for improving thermal efficiency in an entire operating region.

Figure 1:
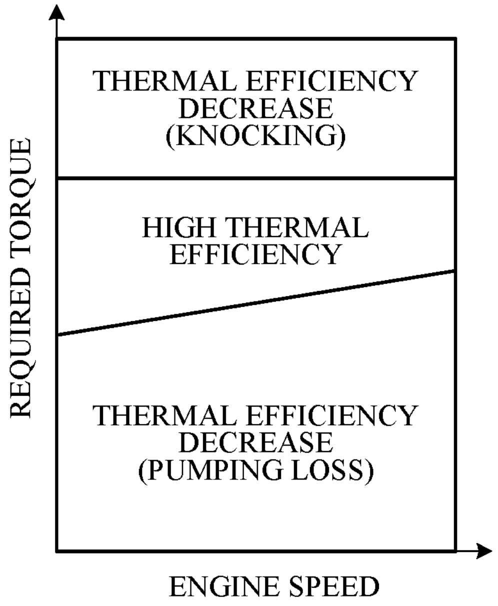
FIG. 1 is a diagram for explaining thermal efficiency of an engine in spark ignition combustion.

FIG. 1 is a diagram for explaining thermal efficiency of an engine in spark ignition (SI) combustion. As illustrated in FIG. 1, when the SI combustion is performed, in a low-load region where the required torque of the engine is small, the required amount of intake air is small. For this reason, a throttle opening decreases, so that the pumping loss at the time of intake increases, and the thermal efficiency decreases. On the other hand, in homogenous charge compression ignition (HCCI) combustion, since the output torque is adjusted by the fuel injection amount, the throttle opening is maintained near a fully opened state even in the low-load region, and a decrease in the thermal efficiency due to the pumping loss does not occur.

When the SI combustion involving ignition is performed, in a high-load region where the required torque of the engine is large, knocking in which an air-fuel mixture self-ignites in the vicinity of a wall surface of a cylinder 2 before flame propagation is suppressed, so that ignition timing needs to be retarded from optimum ignition timing (target ignition timing), and the thermal efficiency decreases. On the other hand, when diffusion combustion not involving ignition is performed, the fuel is mixed with air and combusted while evaporating, so that such a problem does not occur.

Therefore, in the present embodiment, the engine control apparatus is configured as follows so that the thermal efficiency can be improved in the entire operating region of the engine by switching a combustion mode according to the required torque.

Figure 2:
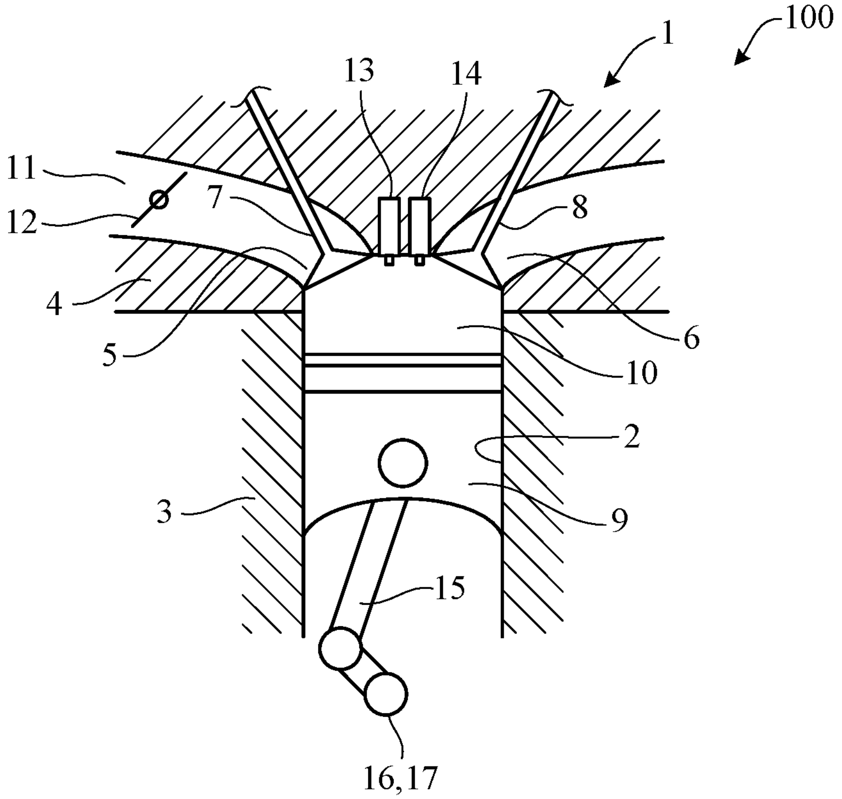
FIG. 2 is a diagram schematically illustrating an example of an internal configuration of an engine of an engine control apparatus according to an embodiment of the present invention.

FIG. 2 is a diagram schematically illustrating an example of an internal configuration of an engine 1 of an engine control apparatus (hereinafter, referred to as the apparatus) 100 according to the embodiment of the present invention. As illustrated in FIG. 2, the engine 1 includes a cylinder block 3 that are provided with cylinders 2, and a cylinder head 4 that covers an upper portion of the cylinder block 3. The cylinder head 4 is provided with an intake port 5 through which intake air to the engine 1 passes and an exhaust port 6 through which exhaust air from the engine 1 passes. The intake port 5 is provided with an intake valve 7 that opens and closes the intake port 5, and the exhaust port 6 is provided with an exhaust valve 8 that opens and closes the exhaust port 6. The intake valve 7 and the exhaust valve 8 are driven to be opened and closed by a valve mechanism (not illustrated).

Figure 4:
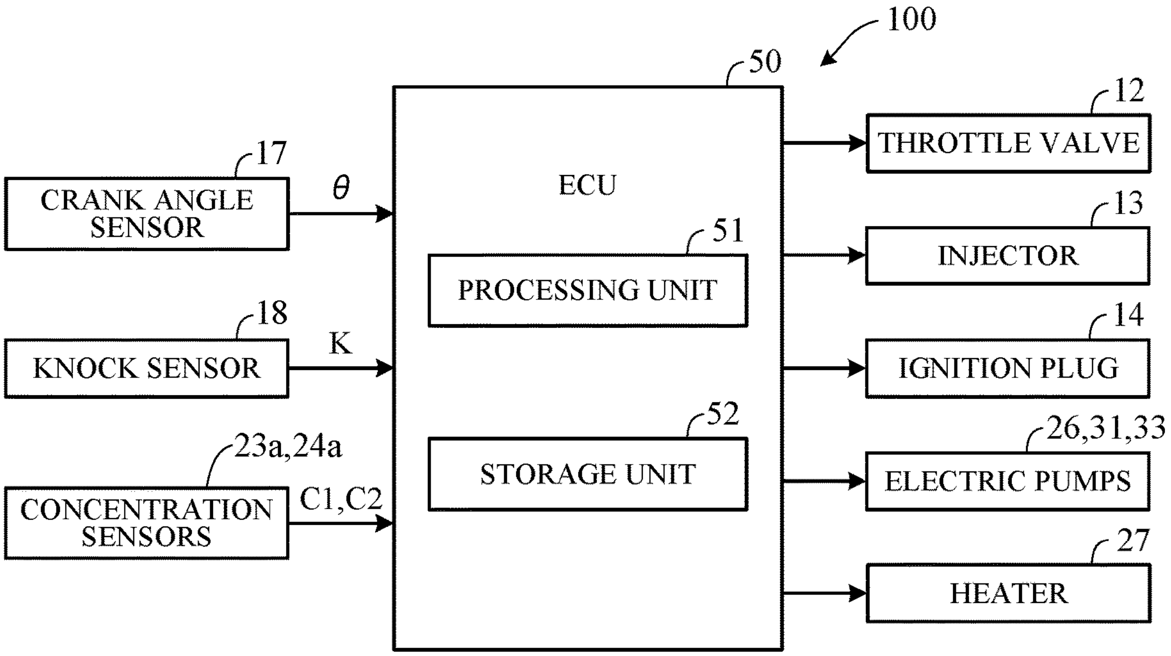
FIG. 4 is a block diagram schematically illustrating an example of a configuration of a main portion of the engine control apparatus according to the embodiment of the present invention.

In each cylinder 2, a piston 9 is disposed slidably within the cylinder 2, and a combustion chamber 10 is provided facing the piston 9. A throttle valve 12 is provided in an intake passage 11 communicating with the combustion chamber 10 through the intake port 5. The throttle valve 12 includes, for example, a butterfly valve, and the amount of air (intake amount) sucked into the combustion chamber 10 is adjusted by the throttle valve 12. An opening (throttle opening) of the throttle valve 12 is controlled by an electronic control unit (ECU) 50 (FIG. 4).

An injector 13 and an ignition plug 14 are attached to the cylinder head 4 so as to face the combustion chamber 10. The injector 13 is configured as a cylinder injection type fuel injection valve, and injects fuel into the combustion chamber 10. The ignition plug 14 generates a spark by electric energy and ignites the air-fuel mixture in the combustion chamber 10. The fuel injection timing (valve opening timing) of the injector 13, the fuel injection amount (valve opening time), the ignition timing of the ignition plug 14, and on/off of ignition by the ignition plug 14 are controlled by the ECU 50 (FIG. 4).

When the intake port 5 is opened, the exhaust port 6 is closed, and the piston 9 descends, air (fresh air) is sucked into the combustion chamber 10 from the intake port 5 (intake stroke). When the intake port 5 and the exhaust port 6 are closed and the piston 9 ascends, the air or air-fuel mixture in the combustion chamber 10 is compressed, and the pressure in the combustion chamber 10 gradually increases (compression stroke).

When the SI combustion is performed, fuel is injected from the injector 13 into the combustion chamber 10 in the intake stroke or the compression stroke, the air-fuel mixture is ignited by the ignition plug 14 in the vicinity of a compression top dead center (TDC), and the fuel in the combustion chamber 10 is combusted by the flame propagation. In the SI combustion, gasoline fuel is used.

In a case of performing the HCCI combustion, the fuel is injected from the injector 13 into the combustion chamber 10 in the intake stroke or the compression stroke, and when the temperature rises by compressing the air-fuel mixture in the combustion chamber 10, the fuel is combusted by self-ignition in the vicinity of the compression top dead center (TDC). In the HCCI combustion, gasoline fuel can be used in a region where the required torque of the engine is relatively large and combustion is stable. When the HCCI combustion is performed in a region where the required torque of the engine is relatively small and combustion is unstable, it is necessary to use fuel having higher ignitability than the gasoline fuel.

In a case where the HCCI combustion is performed in a region where the required torque of the engine is smaller, it is necessary to assist the ignition by igniting the air-fuel mixture by the ignition plug 14 in the vicinity of the compression top dead center (TDC) in addition to using the fuel having high ignitability. Such combustion is hereinafter referred to as spark assist homogeneous charge compression ignition (SAHCCI) combustion. In the SAHCCI combustion, a part of the fuel in the combustion chamber 10 is combusted by the flame propagation, and the remaining fuel is combusted by self-ignition in the combustion chamber 10 having a high temperature by combustion.

In a case of performing the diffusion combustion, when fuel is injected from the injector 13 into the combustion chamber 10, the fuel is mixed with air while being evaporated and combusted. In the diffusion combustion, it is necessary to use fuel having high ignitability.

When the fuel is combusted in the combustion chamber 10, the pressure in the combustion chamber 10 rapidly rises, and the piston 9 descends (expansion stroke). When the intake port 5 is closed, the exhaust port 6 is opened, and the piston 9 ascends, air (exhaust air) in the combustion chamber 10 is discharged from the exhaust port 6 (exhaust stroke). When the piston 9 reciprocates along the inner wall of the cylinder 2, a crank shaft 16 rotates via a connecting rod 15.

The crank shaft 16 of the engine 1 is provided with a crank angle sensor 17 that detects a rotation angle (crank angle) θ of the crank shaft 16. A signal indicating a detection result by the crank angle sensor 17 is transmitted to the ECU 50 (FIG. 4). Although not illustrated, the engine 1 is also provided with a knock sensor 18 (FIG. 4) that is attached to the cylinder block 3 and detects an amplitude value K of the vibration of the engine 1. A signal indicating a detection result by the knock sensor 18 is transmitted to the ECU 50 (FIG. 4). Instead of the knock sensor 18, a cylinder internal pressure sensor that detects a pressure (cylinder internal pressure) P in the combustion chamber 10 may be provided. In this case, a variation dP/dθ of the cylinder internal pressure P with respect to a change in the crank angle θ is calculated, and the amplitude value K of the vibration of the engine 1 can be calculated based on the variation dP/dθ of the cylinder internal pressure P.

Figure 14:
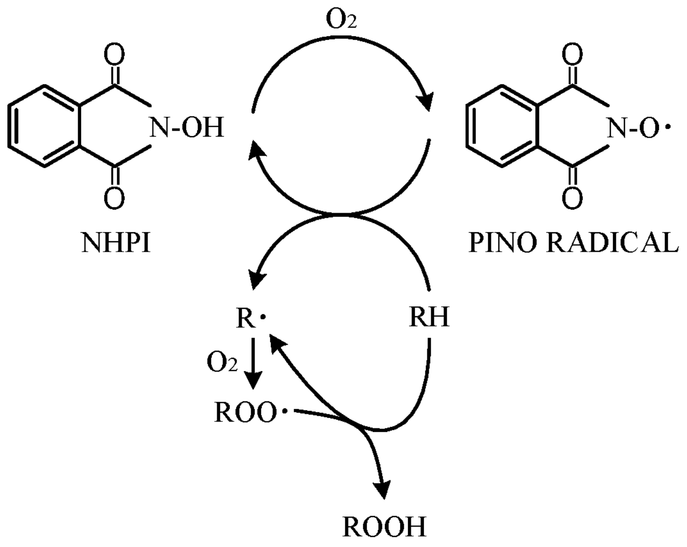
FIG. 14 is a diagram for explaining a chemical reaction when the fuel is reformed.

FIG. 14 is a diagram for explaining a chemical reaction when the fuel is reformed. Gasoline fuel containing a hydrocarbon as a main component is oxidatively reformed using a catalyst such as N-hydroxyphthalimide (NHPI) to produce a peroxide, so that ignitability thereof can be improved. Specifically, with NHPI, a hydrogen molecule is easily extracted using an oxygen molecule to produce a phthalimide-N-oxyl (PINO) radical. With the PINO radical, a hydrogen molecule is extracted from a hydrocarbon (RH) contained in the fuel to produce an alkyl radical (R·). The alkyl radical is bonded to an oxygen molecule to produce an alkyl peroxy radical (ROO·). With the alkyl peroxy radical, a hydrogen molecule is extracted from a hydrocarbon contained in the fuel to produce an alkyl hydroperoxide (ROOH) to be a peroxide, for example, a cumene hydroperoxide.

When the oxidation reaction proceeds, the peroxide concentration increases, and when the oxidation reaction further proceeds, the peroxide is decomposed into oxides such as alcohol, aldehyde, and ketone, and the peroxide concentration decreases and the oxide concentration increases. In order to increase the peroxide concentration in the fuel and improve the ignitability of the fuel, it is necessary to adjust the degree of progress of the oxidation reaction within an appropriate range. Specifically, it is necessary to adjust the peroxide concentration in reformed fuel obtained by oxidatively reforming a part of gasoline fuel to a predetermined concentration or more so that the octane number of the reformed fuel becomes a predetermined value or less.

Figure 3:
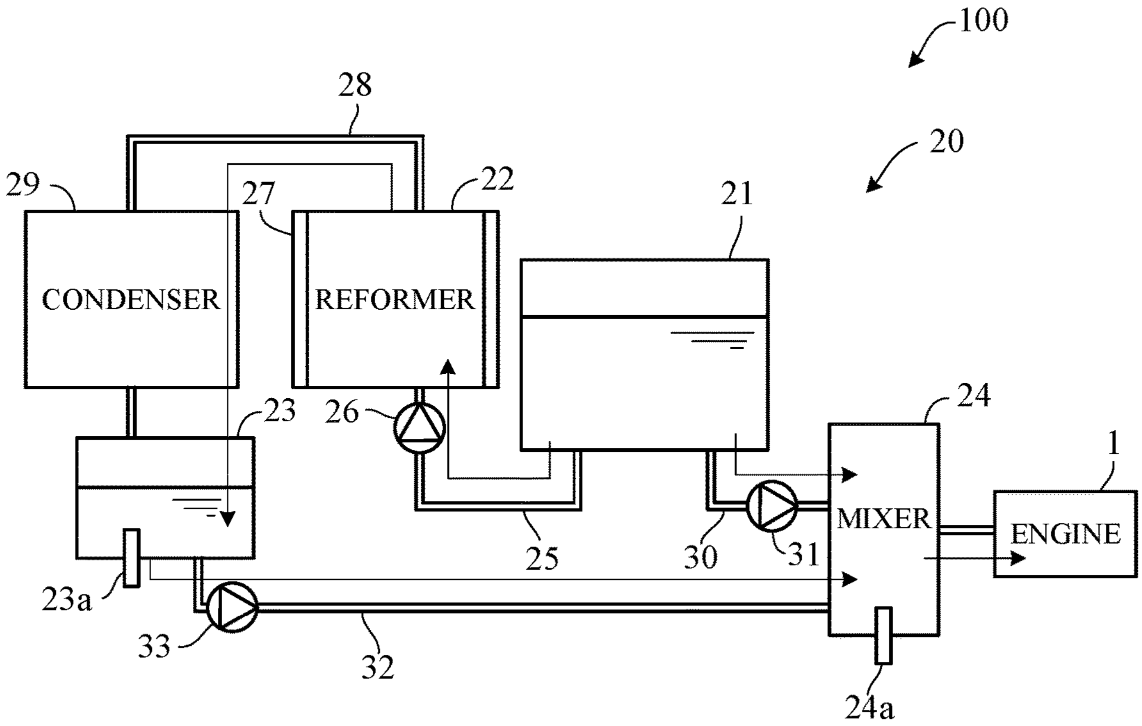
FIG. 3 is a diagram schematically illustrating an example of a fuel supply path for supplying fuel to the engine of the engine control apparatus according to the embodiment of the present invention.

FIG. 3 is a diagram schematically illustrating an example of a fuel supply path 20 for supplying fuel to the engine 1 of the apparatus 100. As illustrated in FIG. 3, the fuel supply path 20 is provided with a fuel tank 21 that stores gasoline fuel, a reformer 22 that oxidatively reforms the gasoline fuel, a reformed fuel tank 23 that stores the reformed fuel, and a mixer 24 that mixes the gasoline fuel and the reformed fuel. The mixed fuel mixed by the mixer 24 is injected into the combustion chamber 10 of the engine 1 through the injector 13 (FIG. 2).

A liquid phase of the fuel tank 21 and an inlet of the reformer 22 are connected via a pipe 25, and the gasoline fuel stored in the fuel tank 21 is supplied to the reformer 22 through the pipe 25 by an electric pump 26 provided in the pipe 25. The operation of the electric pump 26 is controlled by the ECU 50 (FIG. 4).

The reformer 22 is filled with a catalyst such as NHPI. The reformer 22 is provided with a heater 27 that adjusts the temperature of the reformer 22, and oxidatively reforms a part of gasoline fuel supplied from the fuel tank 21 into a peroxide at a reforming rate according to the temperature. The reformed fuel after the oxidative reforming includes a peroxide such as a cumene hydroperoxide in a ratio according to the reforming rate. The operation of the heater 27 is controlled by the ECU 50 (FIG. 4).

An outlet of the reformer 22 and the reformed fuel tank 23 are connected via a pipe 28. The reformed fuel reformed by the reformer 22 is supplied to the reformed fuel tank 23 through the pipe 28. A condenser 29 is provided in the pipe 28 between the reformer 22 and the reformed fuel tank 23. The reformed gaseous fuel is condensed by the condenser 29 and stored as a liquid in the reformed fuel tank 23. The reformed fuel tank 23 is provided with, for example, a capacitance type concentration sensor 23*a*, and the concentration sensor 23*a* detects the peroxide concentration C1 of the reformed fuel stored as a liquid in the reformed fuel tank 23. A signal indicating a detection result by the concentration sensor 23*a* is transmitted to the ECU 50 (FIG. 4).

The liquid phase of the fuel tank 21 is further connected to the mixer 24 via a pipe 30. The gasoline fuel stored in the fuel tank 21 is supplied to the mixer 24 through the pipe 30 by an electric pump 31 provided in the pipe 30. The liquid phase of the reformed fuel tank 23 is connected to the mixer 24 via a pipe 32. The reformed fuel stored in the reformed fuel tank 23 is supplied to the mixer 24 through the pipe 32 by an electric pump 33 provided in the pipe 32. The operations of the electric pumps 31 and 33 are controlled by the ECU 50 (FIG. 4). The mixer 24 is provided with, for example, a capacitance type concentration sensor 24*a*, and the concentration sensor 24*a* detects the peroxide concentration C2 of the mixed fuel. A signal indicating a detection result by the concentration sensor 24*a* is transmitted to the ECU 50 (FIG. 4). When the engine 1 includes a cylinder internal pressure sensor, the ignitability of the fuel supplied to the engine 1 may be estimated based on the cylinder internal pressure P, and the peroxide concentration C2 in the fuel may be estimated based on the ignitability of the fuel. In this case, the concentration sensor 24*a* may be omitted.

FIG. 4 is a block diagram schematically illustrating an example of a configuration of a main portion of the apparatus 100. As illustrated in FIG. 4, the apparatus 100 mainly includes the ECU 50, and the ECU 50 includes a computer having a processing unit 51 such as a CPU, a storage unit 52 such as a ROM or a RAM, and other peripheral circuits (not illustrated) such as an I/O interface. The ECU 50 may be configured as a part of an engine control ECU that controls the operation of the engine 1.

The crank angle sensor 17, the knock sensor 18, and the concentration sensors 23*a* and 24*a* are electrically connected to the ECU 50, and signals from the respective sensors are input to the ECU 50. Further, actuators of the throttle valve 12, the injector 13, the ignition plug 14, the electric pumps 26, 31, and 33, and the heater 27 are electrically connected to the ECU 50, and a control signal is transmitted from the ECU 50 to each actuator.

The ECU 50 controls the opening of the throttle valve 12, the fuel injection timing and the fuel injection amount of the injector 13, the ignition timing of the ignition plug 14, on and off of ignition by the ignition plug 14, and the like according to the operating conditions of the engine 1 such as the engine speed and the required torque. The target opening of the throttle valve 12, the target fuel injection timing and the target fuel injection amount of the injector 13, the target ignition timing of the ignition plug 14, and the like are determined in advance according to the operating conditions of the engine 1, and are stored in the storage unit 52 of the ECU 50 as a characteristic map and the like. The ECU 50 controls the electric pump 26 and the heater 27 such that the peroxide concentration C1 of the reformed fuel detected by the concentration sensor 23*a* is equal to or more than a predetermined concentration corresponding to a predetermined octane number. As a result, the reformed fuel having the peroxide concentration C1 equal to or more than the predetermined concentration and the octane number equal to or less than the predetermined value is stored in the reformed fuel tank 23.

Figure 5:
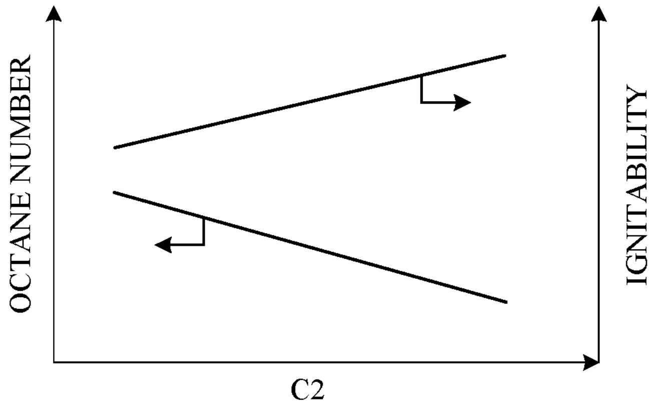
FIG. 5 is a diagram for explaining relation between peroxide concentration in the fuel and octane number and ignitability.

FIG. 5 is a diagram for explaining a relation between the peroxide concentration C2 in the fuel supplied to the engine 1 and the octane number and the ignitability. As illustrated in FIG. 5, the higher the peroxide concentration C2, the lower the octane number and the higher the ignitability.

Figure 6:
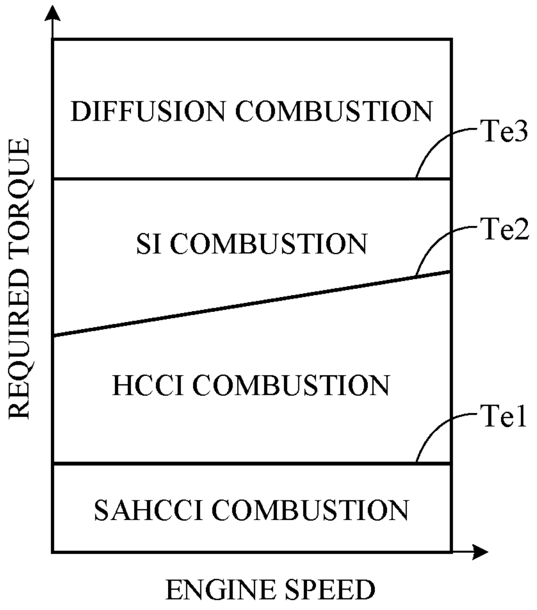
FIG. 6 is a diagram for explaining combustion mode for improving thermal efficiency of the engine.

FIG. 6 is a diagram for explaining a combustion mode for improving thermal efficiency of the engine 1, and illustrates an example of a characteristic map set in advance and stored in the storage unit 52 of the ECU 50. As illustrated in FIG. 6, from the viewpoint of improving the thermal efficiency of the engine 1, it is preferable to perform the SAHCCI combustion when the required torque is less than a first predetermined value Te1, the HCCI combustion when the required torque is equal to or more than the first predetermined value Te1 and less than a second predetermined value Te2, the SI combustion when the required torque is equal to or more than the second predetermined value Te2 and less than a third predetermined value Te3, and the diffusion combustion when the required torque is equal to or more than the third predetermined value Te3 (Te1<Te2<Te3). The first predetermined value Te1, the second predetermined value Te2, and the third predetermined value Te3 are set in advance according to the operating conditions of the engine 1 such as the engine speed and the required torque, and are stored in the storage unit 52 of the ECU 50 as a characteristic map, for example.

The ECU 50 (processing unit 51) refers to the characteristic map stored in the storage unit 52, specifies an optimum combustion mode according to the required torque of the engine 1, and controls the electric pumps 31 and 33, the throttle valve 12, the injector 13, and the ignition plug 14 so as to switch the combustion mode as necessary. More specifically, when combustion with the gasoline fuel is performed, the electric pump 33 is turned off, the electric pump 31 is turned on, and the gasoline fuel stored in the fuel tank 21 is guided to the injector 13 as it is. When combustion with the reformed fuel is performed, the electric pump 31 is turned off, the electric pump 33 is turned on, and the reformed fuel stored in the reformed fuel tank 23 is guided to the injector 13. At this time, when the remaining amount of the reformed fuel stored in the reformed fuel tank 23 is insufficient, the electric pump 31 may be turned on in addition to the electric pump 33 to guide the mixed fuel of the gasoline fuel and the reformed fuel to the injector 13.

When the SI combustion is performed, the throttle valve 12, the injector 13, and the ignition plug 14 are controlled according to a target throttle opening map, a target fuel injection timing map, a target fuel injection amount map, and a target ignition timing map for the SI combustion stored in the storage unit 52. When the HCCI combustion is performed, the throttle valve 12 and the injector 13 are controlled according to a target throttle opening map, a target fuel injection timing map, and a target fuel injection amount map for the HCCI combustion stored in the storage unit 52, and the ignition by the ignition plug 14 is turned off. When the SAHCCI combustion is performed, the throttle valve 12, the injector 13, and the ignition plug 14 are controlled according to a target throttle opening map, a target fuel injection timing map, a target fuel injection amount map, and a target ignition timing map for the SAHCCI combustion stored in the storage unit 52. When the diffusion combustion is performed, the throttle valve 12 and the injector 13 are controlled according to a target throttle opening map, a target fuel injection timing map, and a target fuel injection amount map for the diffusion combustion stored in the storage unit 52, and the ignition by the ignition plug 14 is turned off.

As described above, by switching the combustion mode according to the required torque, the thermal efficiency can be improved in the entire operating region of the engine 1. At this time, by using the reformed fuel in addition to the gasoline fuel, it is possible to switch not only the SI combustion and the HCCI combustion in the middle-load region but also the HCCI combustion and the SAHCCI combustion in the low-load region and the diffusion combustion in the high-load region.

<Switching from SI Combustion to HCCI Combustion>

When the required torque becomes less than the second predetermined value Te2 during the execution of the SI combustion, the ECU 50 performs switching to the HCCI combustion under conditions that the amplitude value K detected by the knock sensor 18 is less than a predetermined amplitude value Kα and the peroxide concentration C2 detected by the concentration sensor **24*a* is equal to or more than a predetermined concentration Cα. The predetermined amplitude value Kα and the predetermined concentration Cα are set in advance according to the operating conditions of the engine 1 such as the engine speed and the required torque, and are stored in the storage unit 52 of the ECU 50** as a characteristic map, for example.

When the peroxide concentration C2 is less than the predetermined concentration Cα and the peroxide concentration in the reformed fuel to be switched is insufficient, the switching can be performed after controlling the electric pump 26 and the heater 27 to increase the peroxide concentration in the reformed fuel.

When the amplitude value K becomes less than the predetermined amplitude value Kα after switching to the HCCI combustion, the ECU 50 determines that the HCCI combustion is stably performed. On the other hand, when the amplitude value K becomes equal to or more than the predetermined amplitude value Kα, the reformed fuel is returned to the gasoline fuel. In this case, the combustion mode shifts to the HCCI combustion using the gasoline fuel. When the amplitude value K is equal to or more than the predetermined amplitude value Kα even after shifting to the HCCI combustion using the gasoline fuel, the combustion mode is returned to the SI combustion, and the combustion mode is returned to the SI combustion using the gasoline fuel.

<Switching from HCCI Combustion to SI Combustion>

When the required torque becomes equal to or more than the second predetermined value Te2 during the execution of the HCCI combustion, the ECU 50 performs switching to the SI combustion under a condition that the amplitude value K is equal to or more than the predetermined amplitude value Kα. When the amplitude value K becomes less than the predetermined amplitude value Kα after switching to the SI combustion, the ECU 50 determines that the SI combustion is stably performed. On the other hand, when the amplitude value K becomes equal to or more than the predetermined amplitude value Kα, the ignition plug 14 is controlled to retard the ignition timing. By retarding the ignition timing until the amplitude value K becomes less than the predetermined amplitude value Kα, the SI combustion can be stabilized.

<Switching from HCCI Combustion to SAHCCI Combustion>

The ECU 50 calculates a crank angular acceleration $d^2\theta/d^2t$ based on the crank angle θ detected by the crank angle sensor 17. When the required torque becomes less than the first predetermined value Te1 during the execution of the HCCI combustion, the ECU 50 performs switching to the SAHCCI combustion under conditions that the crank angular acceleration $d^2\theta/d^2t$ is equal to or more than a predetermined angular velocity aα, the amplitude value K is less than a predetermined amplitude value Kβ, and the peroxide concentration C2 is equal to or more than a predetermined concentration Cβ. The predetermined angular velocity aα, the predetermined amplitude value Kβ, and the predetermined concentration Cβ are set in advance according to the operating conditions of the engine 1 such as the engine speed and the required torque, and are stored in the storage unit 52 of the ECU 50 as a characteristic map, for example.

The ECU 50 determines that the SAHCCI combustion is stably performed when the crank angular acceleration $d^2\theta/d^2t$ becomes less than the predetermined angular velocity aα and the amplitude value K becomes less than the predetermined amplitude value Kβ after switching to the SAHCCI combustion. On the other hand, when the crank angular acceleration $d^2\theta/d^2t$ becomes equal to or more than the predetermined angular velocity aα and the amplitude value K becomes equal to or more than the predetermined amplitude value Kβ, the ignition plug 14 is controlled to retard the ignition timing. By retarding the ignition timing until the crank angular acceleration $d^2\theta/d^2t$ becomes less than the predetermined angular velocity aα and the amplitude value K becomes less than the predetermined amplitude value Kβ, the SAHCCI combustion can be stabilized.

In a case where the switching from the HCCI combustion to the SAHCCI combustion is not performed, the ECU 50 continues the HCCI combustion when the peroxide concentration C2 is equal to or more than the predetermined concentration Cβ. On the other hand, when the peroxide concentration C2 is less than the predetermined concentration Cβ, the combustion mode is switched to the SI combustion using the gasoline fuel. When the crank angular acceleration $d^2\theta/d^2t$ becomes less than the predetermined angular velocity aα and the amplitude value K becomes less than the predetermined amplitude value Kβ after switching to the SI combustion, the ECU 50 determines that the SI combustion is stably performed. On the other hand, when the crank angular acceleration $d^2\theta/d^2t$ becomes equal to or more than the predetermined angular velocity aα and the amplitude value K becomes equal to or more than the predetermined amplitude value Kβ, the ignition plug 14 is controlled to retard the ignition timing. By retarding the ignition timing until the crank angular acceleration $d^2\theta/d^2t$ becomes less than the predetermined angular velocity aα and the amplitude value K becomes less than the predetermined amplitude value Kβ, the SI combustion can be stabilized.

<Switching from SAHCCI Combustion to HCCI Combustion>

When the required torque becomes equal to or more than the first predetermined value Te1 during the execution of the SAHCCI combustion, the ECU 50 performs switching to the HCCI combustion under conditions that the crank angular acceleration $d^2\theta/d^2t$ is less than the predetermined angular velocity aα, the amplitude value K is equal to or more than the predetermined amplitude value Kβ, and the peroxide concentration C2 is equal to or more than a predetermined concentration Cγ. The predetermined concentration Cγ is set in advance according to the operating conditions of the engine 1 such as the engine speed and the required torque, and is stored in the storage unit 52 of the ECU 50 as a characteristic map, for example.

When the amplitude value K becomes less than the predetermined amplitude value Kβ after switching to the HCCI combustion, the ECU 50 determines that the HCCI combustion is stably performed. On the other hand, when the amplitude value K becomes equal to or more than the predetermined amplitude value Kβ, the injector 13 is controlled to inject the gasoline fuel instead of the reformed fuel. By using the gasoline fuel having low ignitability instead of the reformed fuel having high ignitability, the HCCI combustion can be stabilized.

<Switching from SI Combustion to Diffusion Combustion>

When the required torque becomes equal to or more than the third predetermined value Te3 during the execution of the SI combustion, the ECU 50 performs switching to the diffusion combustion under a condition that the amplitude value K is equal to or more than the predetermined amplitude value Kγ. The predetermined amplitude value Kγ is set in advance according to operating conditions of the engine 1 such as the engine speed and the required torque, and is stored in the storage unit 52 of the ECU 50 as a characteristic map, for example.

When the amplitude value K becomes less than a predetermined amplitude value Kε after switching to the diffusion combustion, the ECU 50 determines that the diffusion combustion is stably performed. On the other hand, when the amplitude value K becomes equal to or more than the predetermined amplitude value Kε, the injector 13 is controlled to retard the fuel injection timing. By retarding the fuel injection timing until the amplitude value K becomes less than the predetermined amplitude value Kε, the diffusion combustion can be stabilized. The predetermined amplitude value Kε is set in advance according to the operating conditions of the engine 1 such as the engine speed and the required torque, and is stored in the storage unit 52 of the ECU 50 as a characteristic map, for example.

<Switching from Diffusion Combustion to SI Combustion>

When the required torque becomes less than the third predetermined value Te3 during the execution of the diffusion combustion, the ECU 50 performs switching to the SI combustion under conditions that the crank angular acceleration $d^2\theta/d^2t$ is equal to or more than the predetermined angular velocity aβ and the amplitude value K is less than the predetermined amplitude value Kε. The predetermined angular velocity aβ is set in advance according to the operating conditions of the engine 1 such as the engine speed and the required torque, and is stored in the storage unit 52 of the ECU 50 as a characteristic map, for example.

When the crank angular acceleration $d^2\theta/d^2t$ becomes less than the predetermined angular velocity aβ and the amplitude value K becomes less than the predetermined amplitude value Kε after switching to the SI combustion, the ECU 50 determines that the SI combustion is stably performed. On the other hand, when the crank angular acceleration $d^2\theta/d^2t$ becomes equal to or more than the predetermined angular velocity aβ and the amplitude value K becomes equal to or more than the predetermined amplitude value Kε, the ignition plug 14 is controlled to retard the ignition timing. By retarding the ignition timing until the crank angular acceleration $d^2\theta/d^2t$ becomes less than the predetermined angular velocity aβ and the amplitude value K becomes less than the predetermined amplitude value Kε, the SI combustion can be stabilized.

Figure 7:
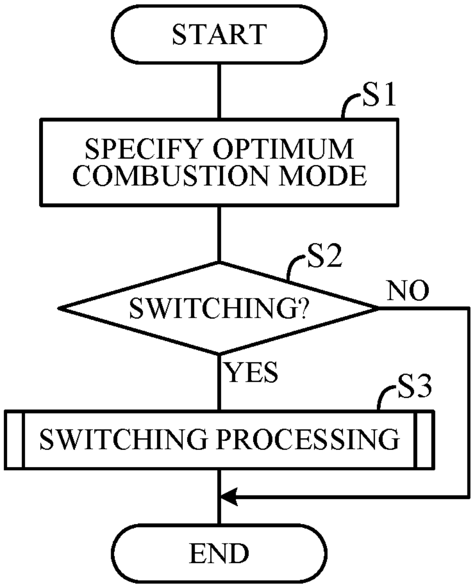
FIG. 7 is a flowchart illustrating an example of combustion mode switching processing executed by an ECU of FIG. 4.

FIGS. 7 to 13 are flowcharts illustrating an example of combustion mode switching processing executed by the ECU 50 of FIG. 4. The processing in FIGS. 7 to 13 is repeatedly executed at a predetermined cycle during operating of the engine 1. As illustrated in FIG. 7, first, in S1 (S: processing step), an optimum combustion mode is specified according to the operating conditions of the engine 1 with reference to the characteristic map stored in the storage unit 52. Next, in S2, it is determined whether or not it is necessary to switch the combustion mode due to the currently executed combustion mode being different from the optimum combustion mode specified in S1. When the determination result is YES in S2, the process proceeds to S3, and the switching processing in FIGS. 8 to 13 is executed. When the determination result is NO in S2, the processing ends.

Figure 8:
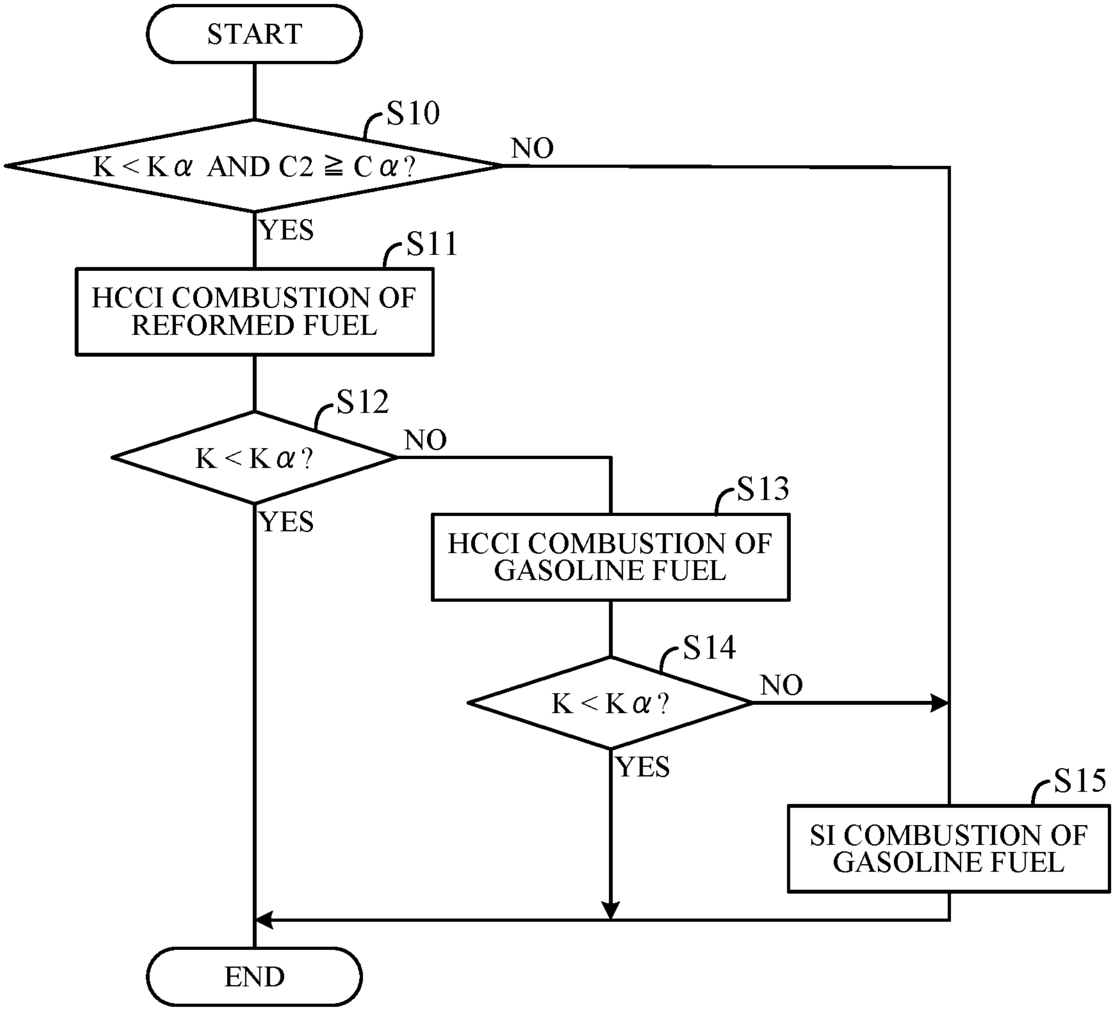
FIG. 8 is a flowchart illustrating an example of processing executed by the ECU of FIG. 4 when switching from the spark ignition combustion to homogenous charge compression ignition combustion.

FIG. 8 illustrates an example of the switching processing when the combustion mode is switched from the SI combustion to the HCCI combustion. As illustrated in FIG. 8, first, in S10, it is determined whether or not the amplitude value K is less than the predetermined amplitude value Kα and the peroxide concentration C2 is equal to or more than the predetermined concentration Cα. When the determination result is YES in S10, the process proceeds to S11, and the electric pumps 31 and 33, the throttle valve 12, the injector 13, and the ignition plug 14 are controlled so as to perform the HCCI combustion by the reformed fuel. Next, in S12, it is determined whether or not the amplitude value K is less than the predetermined amplitude value Kα. When the determination result is YES in S12, it is determined that the combustion is stably performed, and the processing ends. When the determination result is NO in S12, the process proceeds to S13, and the electric pumps 31 and 33, the throttle valve 12, the injector 13, and the ignition plug 14 are controlled so as to perform the HCCI combustion by the gasoline fuel. Next, in S14, it is determined whether or not the amplitude value K is less than the predetermined amplitude value Kα. When the determination result is YES in S14, it is determined that the combustion is stably performed, and the processing ends. When the determination result is NO in S14, the process proceeds to S15, and the electric pumps 31 and 33, the throttle valve 12, the injector 13, and the ignition plug 14 are controlled so as to perform the SI combustion by the gasoline fuel.

Figure 9:
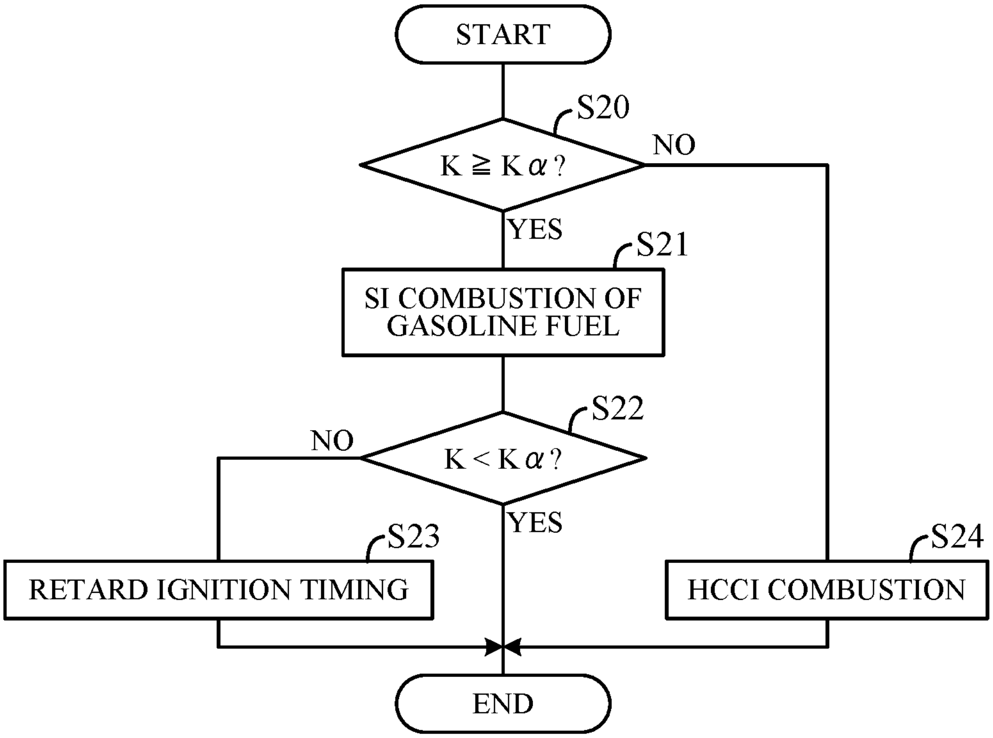
FIG. 9 is a flowchart illustrating an example of processing executed by the ECU of FIG. 4 when switching from the homogenous charge compression ignition combustion to the spark ignition combustion.

FIG. 9 illustrates an example of the switching processing when the combustion mode is switched from the HCCI combustion to the SI combustion. As illustrated in FIG. 9, first, in S20, it is determined whether or not the amplitude value K is equal to or more than the predetermined amplitude value Kα. When the determination result is YES in S20, the process proceeds to S21, and the electric pumps 31 and 33, the throttle valve 12, the injector 13, and the ignition plug 14 are controlled so as to perform the SI combustion by the gasoline fuel. Next, in S22, it is determined whether or not the amplitude value K is less than the predetermined amplitude value Kα. When the determination result is YES in S22, it is determined that the combustion is stably performed, and the processing ends. When the determination result is NO in S22, the process proceeds to S23, and the ignition plug 14 is controlled to retard the ignition timing. When the determination result is NO in S20, the process proceeds to S24, and the electric pumps 31 and 33, the throttle valve 12, the injector 13, and the ignition plug 14 are controlled so as to continue the HCCI combustion.

Figure 10:
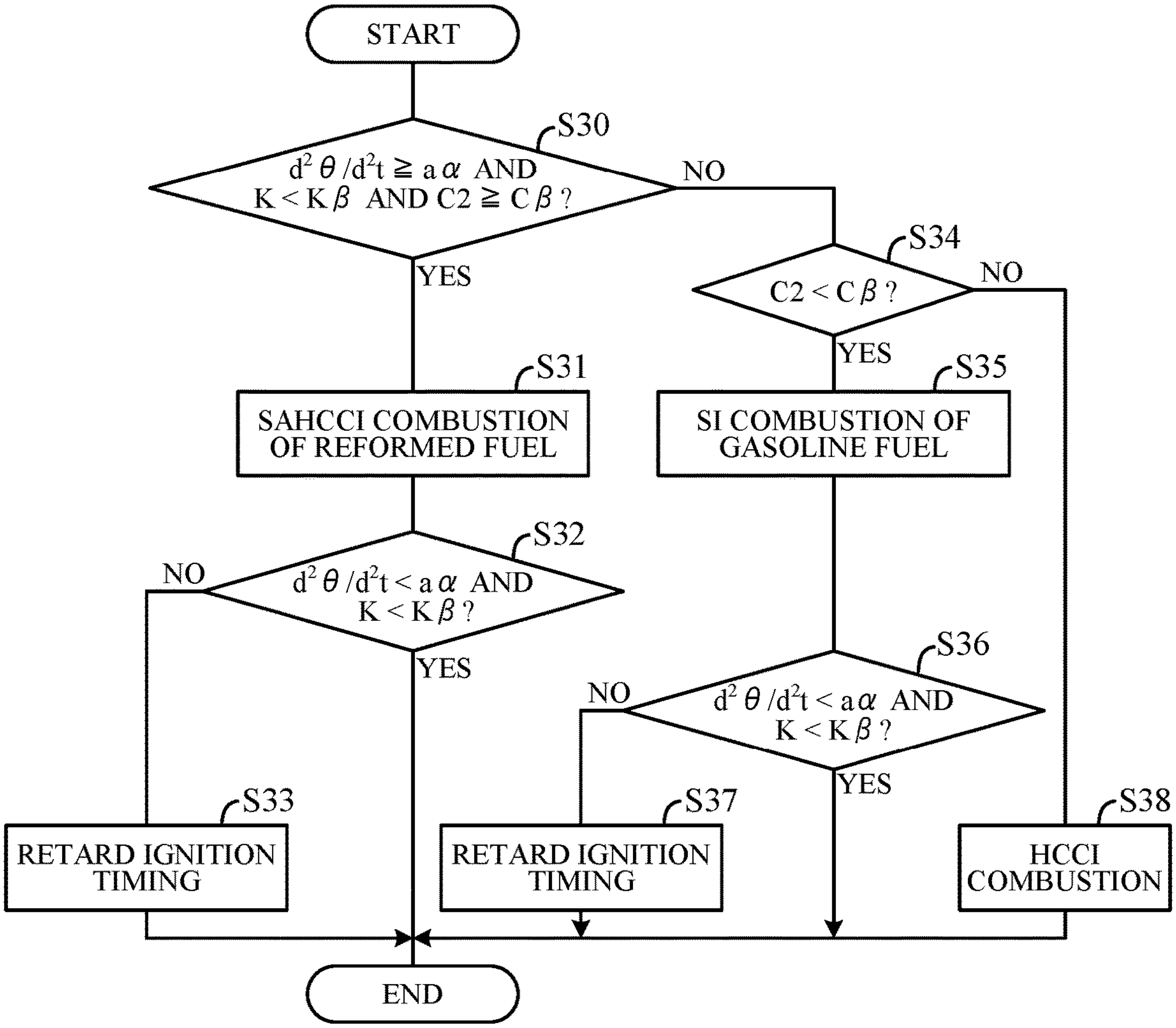
FIG. 10 is a flowchart illustrating an example of processing executed by the ECU of FIG. 4 when switching from the homogenous charge compression ignition combustion to spark assist homogeneous charge compression ignition combustion.

FIG. 10 illustrates an example of the switching processing when the combustion mode is switched from the HCCI combustion to the SAHCCI combustion. As illustrated in FIG. 10, first, in S30, it is determined whether or not the crank angular acceleration $d^2\theta/d^2t$ is equal to or more than the predetermined angular velocity aα, the amplitude value K is less than the predetermined amplitude value Kβ, and the peroxide concentration C2 is equal to or more than the predetermined concentration Cβ. When the determination result is YES in S30, the process proceeds to S31, and the electric pumps 31 and 33, the throttle valve 12, the injector 13, and the ignition plug 14 are controlled so as to perform the SAHCCI combustion by the reformed fuel. Next, in S32, it is determined whether or not the crank angular acceleration $d^2\theta/d^2t$ is less than the predetermined angular velocity aα and the amplitude value K is less than the predetermined amplitude value Kβ. When the determination result is YES in S32, it is determined that the combustion is stably performed, and the processing ends. When the determination result is NO in S32, the process proceeds to S33, and the ignition plug 14 is controlled to retard the ignition timing.

When the determination result is NO in S30, the process proceeds to S34, and it is determined whether or not the peroxide concentration C2 is less than the predetermined concentration Cβ. When the determination result is YES in S34, the process proceeds to S35, and the electric pumps 31 and 33, the throttle valve 12, the injector 13, and the ignition plug 14 are controlled so as to perform the SI combustion by the gasoline fuel. Next, in S36, it is determined whether or not the crank angular acceleration $d^2\theta/d^2t$ is less than the predetermined angular velocity aα and the amplitude value K is less than the predetermined amplitude value Kβ. When the determination result is YES in S36, it is determined that the combustion is stably performed, and the processing ends. When the determination result is NO in S36, the process proceeds to S37, and the ignition plug 14 is controlled to retard the ignition timing. When the determination result is NO in S34, the process proceeds to S38, and the electric pumps 31 and 33, the throttle valve 12, the injector 13, and the ignition plug 14 are controlled so as to continue the HCCI combustion.

Figure 11:
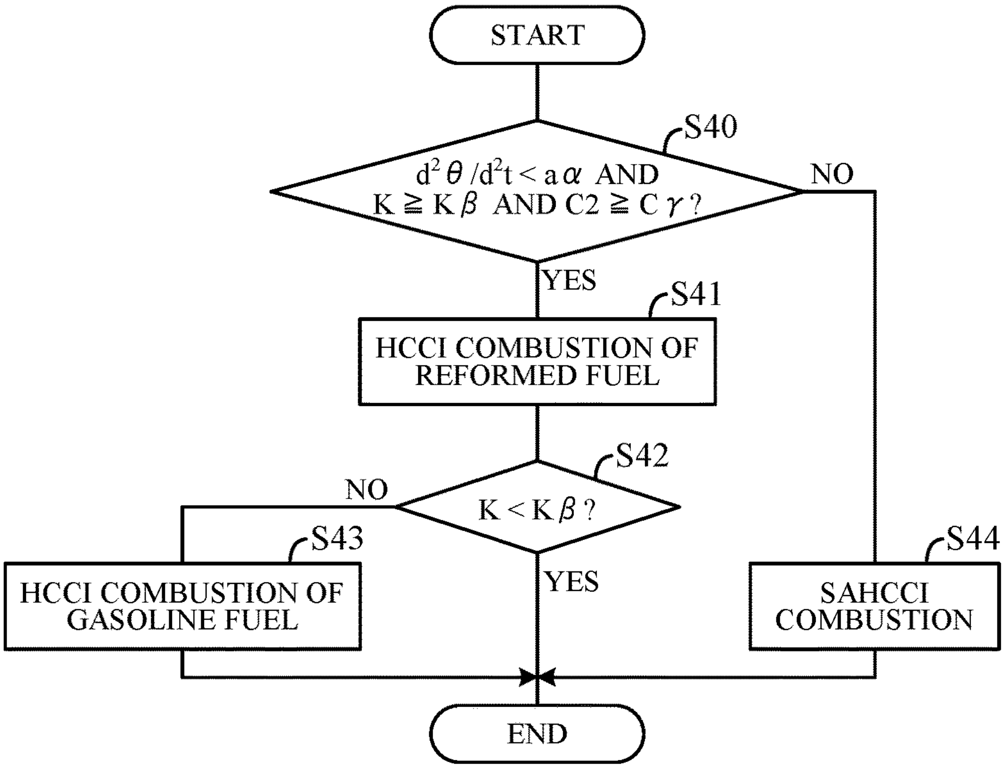
FIG. 11 is a flowchart illustrating an example of processing executed by the ECU of FIG. 4 when switching from the spark assist homogeneous charge compression ignition combustion to the homogenous charge compression ignition combustion.

FIG. 11 illustrates an example of the switching processing when the combustion mode is switched from the SAHCCI combustion to the HCCI combustion. As illustrated in FIG. 11, first, in S40, it is determined whether or not the crank angular acceleration $d^2\theta/d^2t$ is less than the predetermined angular velocity aα, the amplitude value K is equal to or more than the predetermined amplitude value Kβ, and the peroxide concentration C2 is equal to or more than the predetermined concentration Cγ. When the determination result is YES in S40, the process proceeds to S41, and the electric pumps 31 and 33, the throttle valve 12, the injector 13, and the ignition plug 14 are controlled so as to perform the HCCI combustion by the reformed fuel. Next, in S42, it is determined whether or not the amplitude value K is less than the predetermined amplitude value Kβ. When the determination result is YES in S42, it is determined that the combustion is stably performed, and the processing ends. When the determination result is NO in S42, the process proceeds to S43, and the electric pumps 31 and 33, the throttle valve 12, the injector 13, and the ignition plug 14 are controlled so as to perform the HCCI combustion by the gasoline fuel. When the determination result is NO in S40, the process proceeds to S44, and the electric pumps 31 and 33, the throttle valve 12, the injector 13, and the ignition plug 14 are controlled so as to continue the SAHCCI combustion.

Figure 12:
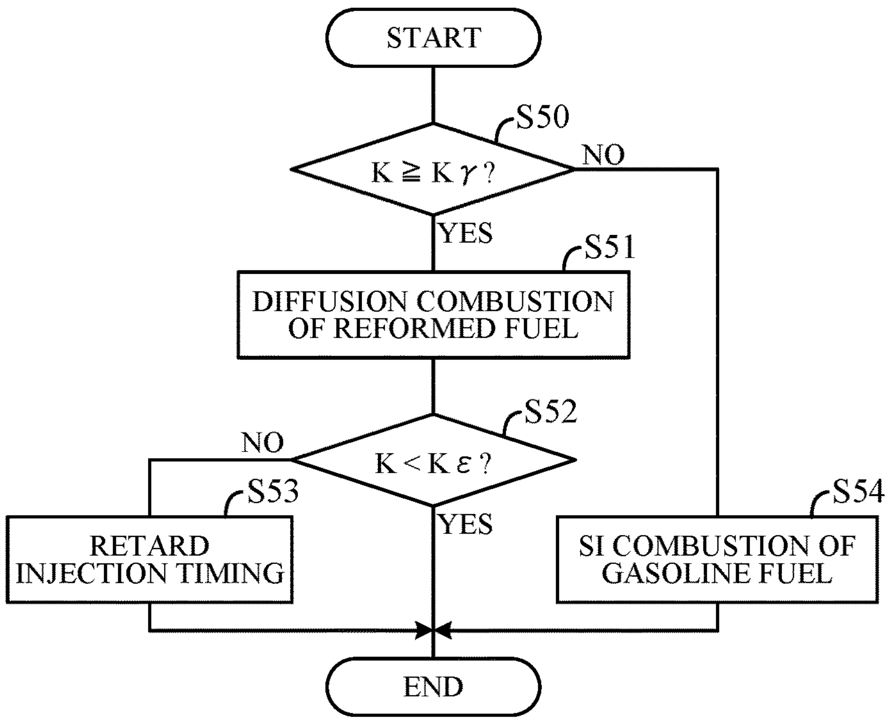
FIG. 12 is a flowchart illustrating an example of processing executed by the ECU of FIG. 4 when switching from the spark ignition combustion to diffusion combustion.

FIG. 12 illustrates an example of the switching processing when the combustion mode is switched from the SI combustion to the diffusion combustion. As illustrated in FIG. 12, first, in S50, it is determined whether or not the amplitude value K is equal to or more than the predetermined amplitude value Kγ. When the determination result is YES in S50, the process proceeds to S51, and the electric pumps 31 and 33, the throttle valve 12, the injector 13, and the ignition plug 14 are controlled so as to perform the diffusion combustion by the reformed fuel. Next, in S52, it is determined whether or not the amplitude value K is less than the predetermined amplitude value Kε. When the determination result is YES in S52, it is determined that the combustion is stably performed, and the processing ends. When the determination result is NO in S52, the process proceeds to S53, and the injector 13 is controlled to retard the injection timing. When the determination result is NO in S50, the process proceeds to S54, and the electric pumps 31 and 33, the throttle valve 12, the injector 13, and the ignition plug 14 are controlled so as to continue the SI combustion by the gasoline fuel.

Figure 13:
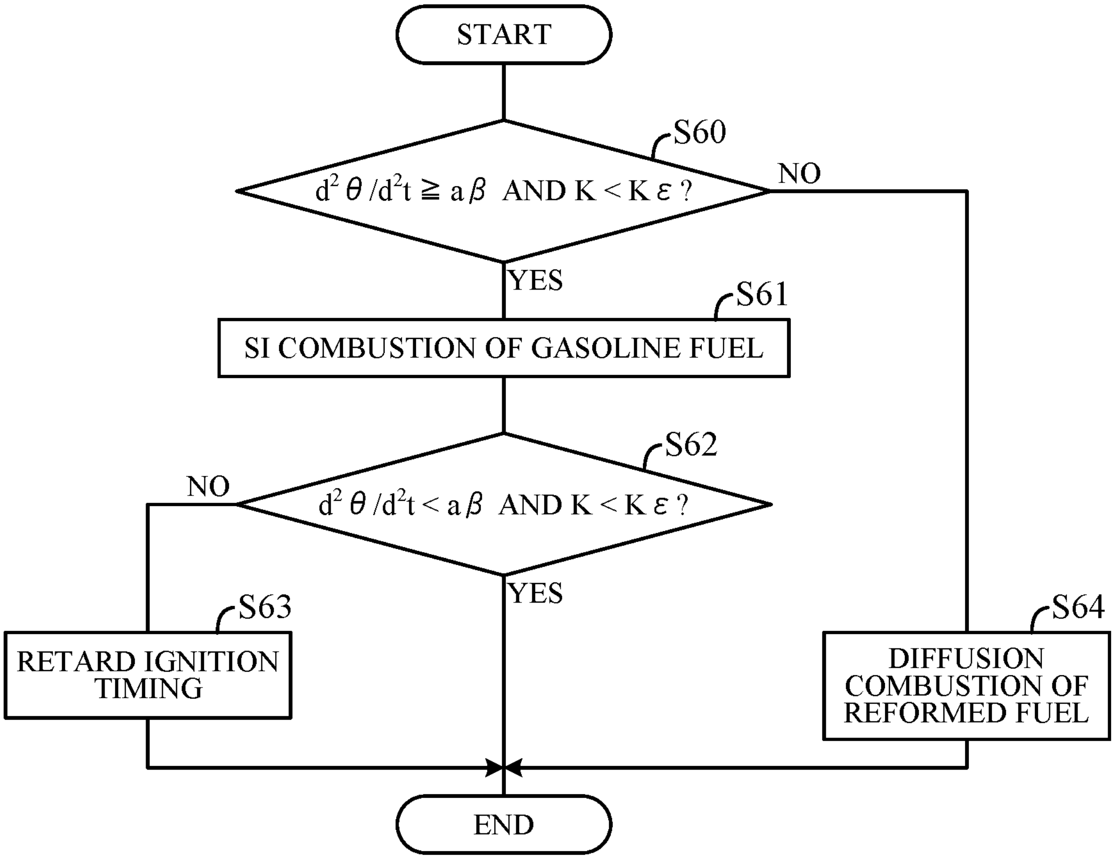
FIG. 13 is a flowchart illustrating an example of processing executed by the ECU of FIG. 4 when switching from the diffusion combustion to the spark ignition combustion.

FIG. 13 illustrates an example of the switching processing when the combustion mode is switched from the diffusion combustion to the SI combustion. As illustrated in FIG. 13, first, in S60, it is determined whether or not the crank angular acceleration $d^2\theta/d^2t$ is equal to or more than the predetermined angular velocity aβ and the amplitude value K is less than the predetermined amplitude value Kε. When the determination result is YES in S60, the process proceeds to S61, and the electric pumps 31 and 33, the throttle valve 12, the injector 13, and the ignition plug 14 are controlled so as to perform the SI combustion by the gasoline fuel. Next, in S62, it is determined whether or not the crank angular acceleration $d^2\theta/d^2t$ is less than the predetermined angular velocity aβ and the amplitude value K is less than the predetermined amplitude value Kε. When the determination result is YES in S62, it is determined that the combustion is stably performed, and the processing ends. When the determination result is NO in S62, the process proceeds to S63, and the ignition plug 14 is controlled to retard the ignition timing. When the determination result is NO in S60, the process proceeds to S64, and the electric pumps 31 and 33, the throttle valve 12, the injector 13, and the ignition plug 14 are controlled so as to continue the diffusion combustion by the reformed fuel.

According to the present embodiment, the following functions and effects can be achieved.

(1) The apparatus 100 includes the engine 1 having the injector 13 that injects fuel into the combustion chamber 10 and the ignition plug 14 that ignites the air-fuel mixture of the fuel and the air in the combustion chamber 10, and the ECU 50 that controls the injector 13 and the ignition plug 14 so as to switch the combustion mode according to the required torque of the engine 1 (FIGS. 2, 4, and 7). The combustion mode includes the SI combustion involving ignition of the gasoline fuel, the HCCI combustion not involving ignition of the reformed fuel obtained by reforming a portion of the gasoline fuel into the peroxide, the SAHCCI combustion involving ignition of the reformed fuel, and the diffusion combustion not involving ignition of the reformed fuel (FIG. 6).

The ECU 50 controls the injector 13 and the ignition plug 14 so as to switch the combustion mode to the SAHCCI combustion when the required torque is less than the first predetermined value Te1, switch the combustion mode to the HCCI combustion when the required torque is equal to or more than the first predetermined value Te1 and less than the second predetermined value Te2 larger than the first predetermined value Te1, switch the combustion mode to the SI combustion when the required torque is equal to or more than the second predetermined value Te2 and less than the third predetermined value Te3 larger than the second predetermined value Te2, and switch the combustion mode to the diffusion combustion when the required torque is equal to or more than the third predetermined value Te3 (FIGS. 6 to 13). As described above, by switching the combustion mode according to the required torque of the engine 1 and adopting the optimum combustion mode, the thermal efficiency can be improved in the entire operating region of the engine 1.

(2) The apparatus 100 includes the concentration sensor **24*a* that detects the peroxide concentration C2 of the fuel injected into the combustion chamber 10, and the knock sensor 18 that detects the amplitude value K of the vibration of the engine 1 (FIG. 4). The ECU 50 controls the injector 13 and the ignition plug 14 so as to switch the combustion mode from the SI combustion to the HCCI combustion under conditions that the amplitude value K detected by the knock sensor 18 is less than the predetermined amplitude value Kα and the peroxide concentration C2 detected by the concentration sensor 24*a* is equal to or more than the predetermined concentration Cα (FIG. 8**).

(3) The apparatus 100 includes the knock sensor 18 that detects the amplitude value K of the vibration of the engine 1 (FIG. 4). The ECU 50 controls the injector 13 and the ignition plug 14 so as to switch the combustion mode from the HCCI combustion to the SI combustion under a condition that the amplitude value K detected by the knock sensor 18 is equal to or more than the predetermined amplitude value Kα (FIG. 9).

By adopting the SI combustion in the middle-load region of the engine 1 and the HCCI combustion in the low-load region, it is possible to eliminate a decrease in thermal efficiency due to the pumping loss and to improve thermal efficiency in the low-load region of the engine 1. At this time, by switching the combustion mode under conditions that the amplitude value K of the vibration of the engine 1 and the peroxide concentration C2 satisfy the predetermined conditions, it is possible to ensure stability of the combustion when the combustion mode is switched.

(4) The apparatus 100 includes the crank angle sensor 17 that detects the crank angle θ of the engine 1, the concentration sensor **24*a* that detects the peroxide concentration C2 of fuel injected into the combustion chamber 10, and the knock sensor 18 that detects the amplitude value K of the vibration of the engine 1 (FIG. 4). The ECU 50 calculates the crank angular acceleration $d^2\theta/d^2t$ based on the crank angle θ detected by the crank angle sensor 17, and controls the injector 13 and the ignition plug 14 so as to switch the combustion mode from the HCCI combustion to the SAHCCI combustion under conditions that the calculated crank angular acceleration $d^2\theta/d^2t$ is equal to or more than the predetermined angular velocity aα, the amplitude value K detected by the knock sensor 18 is less than the predetermined amplitude value Kβ, and the peroxide concentration C2 detected by the concentration sensor 24*a* is equal to or more than the predetermined concentration Cβ (FIG. 10**).

(5) The apparatus 100 includes the crank angle sensor 17 that detects the crank angle θ of the engine 1, the concentration sensor **24*a* that detects the peroxide concentration C2 of fuel injected into the combustion chamber 10, and the knock sensor 18 that detects the amplitude value K of the vibration of the engine 1 (FIG. 4). The ECU 50 calculates the crank angular acceleration $d^2\theta/d^2t$ based on the crank angle θ detected by the crank angle sensor 17, and controls the injector 13 and the ignition plug 14 so as to switch the combustion mode from SAHCCI combustion to HCCI combustion under conditions that the calculated crank angular acceleration $d^2\theta/d^2t$ is less than the predetermined angular velocity aα, the amplitude value K detected by the knock sensor 18 is equal to or more than the predetermined amplitude value Kβ, and the peroxide concentration C2 detected by the concentration sensor 24*a* is equal to or more than the predetermined concentration Cγ (FIG. 11**).

In the extremely low-load region where the required torque is particularly small in the low-load region of the engine 1, the SAHCCI combustion is adopted, and the self-ignition of the fuel is assisted by ignition, so that stability of the combustion in the extremely low-load region can be secured. At this time, by switching the combustion mode under conditions that the amplitude value K of the vibration of the engine 1, the peroxide concentration C2, and the crank angular acceleration $d^2\theta/d^2t$ satisfy the predetermined conditions, it is possible to secure the stability of the combustion when the combustion mode is switched.

(6) The apparatus 100 includes the knock sensor 18 that detects the amplitude value K of the vibration of the engine 1 (FIG. 4). The ECU 50 controls the injector 13 and the ignition plug 14 so as to switch the combustion mode from the SI combustion to the diffusion combustion under a condition that the amplitude value K detected by the knock sensor 18 is equal to or more than the predetermined amplitude value $K\gamma$ (FIG. 12).

(7) The apparatus 100 includes the crank angle sensor 17 that detects the crank angle θ of the engine 1 and the knock sensor 18 that detects the amplitude value K of the vibration of the engine 1 (FIG. 4). The ECU 50 calculates the crank angular acceleration $d^2\theta/d^2t$ based on the crank angle θ detected by the crank angle sensor 17, and controls the injector 13 and the ignition plug 14 so as to switch the combustion mode from the diffusion combustion to the SI combustion under conditions that the calculated crank angular acceleration $d^2\theta/d^2t$ is equal to or more than the predetermined angular velocity $a\beta$ and the amplitude value K detected by the knock sensor 18 is less than the predetermined amplitude value $K\varepsilon$ (FIG. 13).

By adopting the SI combustion in the middle-load region of the engine 1 and the diffusion combustion in the high-load region, it is possible to eliminate the decrease in thermal efficiency due to the ignition timing retard for avoiding knocking and to improve the thermal efficiency in the high-load region of the engine 1. At this time, by switching the combustion mode under conditions that the amplitude value K of the vibration of the engine 1 and the crank angular acceleration $d^2\theta/d^2t$ satisfy the predetermined conditions, it is possible to ensure stability of the combustion when the combustion mode is switched.

In the above embodiment, the internal configuration of the engine 1 has been exemplified in FIG. 2 and the like, but the internal configuration of the engine such as the arrangement of the injector and the ignition plug is not limited to the illustrated internal configuration.

In the above embodiment, the example in which the reformed fuel reformed on board by the reformer 22 mounted on the vehicle is used has been described, but the reformed fuel obtained by reforming a part of the gasoline fuel into the peroxide is not limited thereto. For example, the reformed fuel may be a reformed fuel manufactured in advance and stored in an in-vehicle fuel tank.

In the above embodiment, the example in which the reformed fuel is stored in the reformed fuel tank 23, and the ECU 50 controls the electric pump 33 and the injector 13 and supplies the reformed fuel to the engine 1 has been described with reference to FIGS. 3, 4, and the like, but the control unit that controls the injector is not limited thereto. For example, the reformed fuel may be supplied to the engine 1 by controlling the electric pump 26 and the heater 27 instead of the electric pump 33 and switching on and off of the reformer 22 or adjusting the reforming rate or the reforming amount by the reformer 22. In this case, the reformed fuel tank 23 and the electric pump 33 may not be provided.

In the above embodiment, the example in which the mixer 24 for mixing the gasoline fuel and the reformed fuel is provided has been described with reference to FIG. 3 and the like, but the mixer 24 may not be provided when a sufficient amount of reformed fuel can be supplied.

The above embodiment can be combined as desired with one or more of the aforesaid modifications. The modifications can also be combined with one another.

According to the present invention, it becomes possible to improve thermal efficiency of the engine.

Above, while the present invention has been described with reference to the preferred embodiments thereof, it will be understood, by those skilled in the art, that various changes and modifications may be made thereto without departing from the scope of the appended claims.

The invention claimed is:

1. An engine control apparatus, comprising:
- an engine including an injector configured to inject fuel into a combustion chamber and an ignition plug configured to ignite an air-fuel mixture of the fuel and air in the combustion chamber; and
- a controller configured to control the injector and the ignition plug to switch a combustion mode based on a required torque of the engine, wherein
- the fuel is one of gasoline fuel and reformed fuel obtained by reforming a portion of the gasoline fuel into peroxide, wherein
- the combustion mode includes:
  - a spark ignition combustion of the gasoline fuel with ignition;
  - a first homogenous charge compression ignition combustion of the reformed fuel without ignition;
  - a second homogenous charge compression ignition combustion of the reformed fuel with ignition; and
  - a diffusion combustion of the reformed fuel without ignition, wherein the controller controls the injector and the ignition plug:
  - to switch the combustion mode to the second homogenous charge compression ignition combustion when the required torque is less than a first predetermined value;
  - to switch the combustion mode to the first homogenous charge compression ignition combustion when the required torque is equal to or more than the first predetermined value and less than a second predetermined value larger than the first predetermined value;
  - to switch the combustion mode to the spark ignition combustion when the required torque is equal to or more than the second predetermined value and less than a third predetermined value larger than the second predetermined value; and
  - to switch the combustion mode to the diffusion combustion when the required torque is equal to or more than the third predetermined value.

2. The engine control apparatus according to claim 1, further comprising:
- a concentration sensor configured to detect a peroxide concentration of the fuel injected into the combustion chamber; and
- a knock sensor configured to detect an amplitude value of vibration of the engine, wherein
- the controller controls the injector and the ignition plug to switch the combustion mode from the spark ignition combustion to the first homogenous charge compression ignition combustion on condition that the amplitude value detected by the knock sensor is less than a predetermined amplitude value and the peroxide concentration detected by the concentration sensor is equal to or more than a predetermined concentration.

3. The engine control apparatus according to claim 1, further comprising:

a knock sensor configured to detect an amplitude value of vibration of the engine, wherein the controller controls the injector and the ignition plug to switch the combustion mode from the first homogenous charge compression ignition combustion to the spark ignition combustion on condition that the amplitude value detected by the knock sensor is equal to or more than a predetermined amplitude value.

4. The engine control apparatus according to claim 1, further comprising:

a crank angle sensor configured to detect a crank angle of the engine;

a concentration sensor configured to detect a peroxide concentration of the fuel injected into the combustion chamber; and a knock sensor configured to detect an amplitude value of vibration of the engine, wherein the controller:

calculates a crank angular acceleration based on the crank angle detected by the crank angle sensor; and controls the injector and the ignition plug to switch the combustion mode from the first homogenous charge compression ignition combustion to the second homogenous charge compression ignition combustion on condition that the calculated crank angular acceleration is equal to or more than a predetermined angular velocity, the amplitude value detected by the knock sensor is less than a predetermined amplitude value, and the peroxide concentration detected by the concentration sensor is equal to or more than a predetermined concentration.

5. The engine control apparatus according to claim 1, further comprising:

a crank angle sensor configured to detect a crank angle of the engine;

a concentration sensor configured to detect a peroxide concentration of the fuel injected into the combustion chamber; and a knock sensor configured to detect an amplitude value of vibration of the engine, wherein the controller:

calculates a crank angular acceleration based on the crank angle detected by the crank angle sensor; and controls the injector and the ignition plug to switch the combustion mode from the second homogenous charge compression ignition combustion to the first homogenous charge compression ignition combustion on condition that the calculated crank angular acceleration is less than a predetermined angular velocity, the amplitude value detected by the knock sensor is equal to or more than a predetermined amplitude value, and the peroxide concentration detected by the concentration sensor is equal to or more than a predetermined concentration.

6. The engine control apparatus according to claim 1, further comprising:

a knock sensor configured to detect an amplitude value of vibration of the engine, wherein the controller controls the injector and the ignition plug to switch the combustion mode from the spark ignition combustion to the diffusion combustion on condition that the amplitude value detected by the knock sensor is equal to or more than a predetermined amplitude value.

7. The engine control apparatus according to claim 1, further comprising:

a crank angle sensor configured to detect a crank angle of the engine; and a knock sensor configured to detect an amplitude value of vibration of the engine, wherein the controller:

calculates a crank angular acceleration based on the crank angle detected by the crank angle sensor; and controls the injector and the ignition plug to switch the combustion mode from the diffusion combustion to the spark ignition combustion on condition that the calculated crank angular acceleration is equal to or more than a predetermined angular velocity and the amplitude value detected by the knock sensor is less than a predetermined amplitude value.

8. The engine control apparatus according to claim 1, wherein the reformed fuel contains the peroxide of a predetermined concentration or more, wherein an octane number of the reformed fuel is lower than an octane number of the gasoline fuel.

* * * * *